(12) United States Patent
Konishiike et al.

(10) Patent No.: US 8,728,660 B2
(45) Date of Patent: May 20, 2014

(54) ANODE HAVING AN ANODE LEAD BONDED TO AN ACTIVE MATERIAL LAYER, METHOD OF MANUFACTURING OF THE ANODE, AND BATTERY INCLUDING THE ANODE

(75) Inventors: Isamu Konishiike, Fukushima (JP); Kenichi Kawase, Fukushima (JP)

(73) Assignee: Sony Corporation, Tokyo (JP)

( * ) Notice: Subject to any disclaimer, the term of this patent is extended or adjusted under 35 U.S.C. 154(b) by 923 days.

(21) Appl. No.: 11/539,720

(22) Filed: Oct. 9, 2006

(65) Prior Publication Data

US 2007/0154808 A1    Jul. 5, 2007

(30) Foreign Application Priority Data

Oct. 18, 2005  (JP) ................ P2005-302631

(51) Int. Cl.
*H01M 4/02*   (2006.01)
*H01M 4/58*   (2010.01)

(52) U.S. Cl.
USPC .................................... 429/211; 429/218.1

(58) Field of Classification Search
None
See application file for complete search history.

(56) References Cited

U.S. PATENT DOCUMENTS

| 2002/0102348 A1* | 8/2002 | Yagi et al. .................. 427/58 |
| 2005/0079421 A1* | 4/2005 | Konishiike et al. ....... 429/231.95 |
| 2005/0089759 A1* | 4/2005 | Hwang et al. ............. 429/245 |

FOREIGN PATENT DOCUMENTS

| JP | 10-261439 | 9/1998 |
| JP | 2003-162999 | 6/2003 |
| JP | 2005-222927 | 8/2005 |

* cited by examiner

*Primary Examiner* — Melvin C Mayes
*Assistant Examiner* — Colin W Slifka
(74) *Attorney, Agent, or Firm* — Dentons US LLP

(57) ABSTRACT

An anode which can improve contact characteristics between an active material layer and anode lead and can prevent electrical resistance from increasing, a method of manufacturing the anode, and a battery including the anode are provided. An active material layer containing silicon as an element is provided on a current collector. An anode lead is bonded to the active material layer. At least part of a bond region between the anode lead and the active material layer is made of copper or an alloy containing copper. Thereby, the electrical resistance can be prevented from being increased even though the anode lead is bonded to the active material layer. The anode lead may be made of copper or an alloy containing copper. Otherwise, coating layer made of copper or an alloy containing copper may be provided on the surface of a base.

18 Claims, 3 Drawing Sheets

ANODE HAVING AN ANODE LEAD BONDED TO AN ACTIVE MATERIAL LAYER, METHOD OF MANUFACTURING OF THE ANODE, AND BATTERY INCLUDING THE ANODE

CROSS REFERENCES TO RELATED APPLICATIONS

The present invention contains subject matter related to Japanese Patent Application JP 2005-302631 filed in the Japanese Patent Office on Oct. 18, 2005, the entire contents of which being incorporated herein by reference.

BACKGROUND OF THE INVENTION

1. Field of the Invention

The present invention relates to an anode provided with an active material layer containing silicon (Si) as an element, a method of manufacturing the anode, and a battery including the anode. In particular, the invention relates to an anode suitable for forming an active material layer by vapor-phase deposition method, a method of manufacturing it, and a battery including it.

2. Description of the Related Art

In recent years, as mobile devices have been sophisticated and multi-functionalized, a higher capacity of secondary batteries as a power source for these mobile devices has been demanded. As a secondary battery to meet such a demand, there is a lithium ion secondary battery. However, since graphite is used for the anode in the lithium ion secondary battery in practical use currently, the battery capacity thereof is in a saturated state and thus it is difficult to attain a vastly high capacity thereof. Therefore, it is considered to use silicon or the like for the anode. Recently, forming an active material layer on a current collector by vapor-phase deposition method or the like has been reported. Silicon or the like is largely expanded and shrunk due to charge and discharge, and thus there has been a disadvantage that the cycle characteristics are lowered due to pulverization. However, when using the vapor-phase deposition method or the like, such pulverization can be prevented, and the current collector and the active material layer can be integrated. In the result, electron conductivity in the anode becomes extremely favorable, and high performance both in the capacity and the cycle life is expected.

In general, in a battery, electrons generated by electrochemical reaction in the battery need to be taken out outside via a current collector and a lead. In the past, to improve weldability, an exposed portion on which an active material layer is not provided is left in part of a current collector. An anode lead is attached to the exposed portion by ultrasonic welding or the like. For forming an active material layer of an anode by vapor-phase deposition method, for example, forming the active material layer on the current collector in a given pattern by using a shutter, a mask or the like has been proposed (for example, refer to Japanese Unexamined Patent Application Publication No. 2003-162999).

SUMMARY OF THE INVENTION

However, pattern deposition by a shutter mechanism has lead to a complex device structure and has caused lowering of productivity. When using a mask or the like, many extraneous matters are attached on the mask in depositing plenty of materials, and thus such a method is not practical in manufacturing a battery electrode.

Meanwhile, when an active material layer is formed on the whole face of a current collector by vapor-phase deposition method and an anode lead made of nickel (Ni) is welded to the active material layer, contact characteristics between the active material layer and the anode lead are lowered, and electrical resistance is increased. Therefore, there have been disadvantages such as lowering or fluctuation of the battery voltage, lowering or fluctuation of the battery capacity, and deterioration of the cycle characteristics.

In view of the foregoing, in the invention, it is desirable to provide an anode which can improve contact characteristics between an active material layer and an anode lead and can prevent electrical resistance from increasing, a method of manufacturing the anode, and a battery including the anode.

According to an embodiment of the invention, there is provided a first anode in which an active material layer containing silicon as an element is provided on a current collector, wherein an anode lead is bonded to the active material layer, and the anode lead is made of copper (Cu) or an alloy containing copper in at least part of a bond region between the anode lead and the active material layer.

According to an embodiment of the invention, there is provided a second anode in which an active material layer containing silicon as an element is provided on a current collector, wherein an anode lead is bonded to the active material layer with a bond made of copper or an alloy containing copper in between.

According to an embodiment of the invention, there is provided a first method of manufacturing an anode in which an active material layer containing silicon as an element is provided on a current collector, including a step of bonding an anode lead made of copper or an alloy containing copper in at least part of a bond region between the anode lead and the active material layer to the active material layer.

According to an embodiment of the invention, there is provided a second method of manufacturing an anode in which an active material layer containing silicon as an element is provided on a current collector, including a step of bonding an anode lead to the active material layer with a bond made of copper or an alloy containing copper in between.

According to an embodiment of the invention, there is provided a first battery including a cathode, an anode, and an electrolyte, wherein the anode is provided with an active material layer containing silicon as an element on a current collector, an anode lead is bonded to the active material layer, and the anode lead is made of copper or an alloy containing copper in at least part of a bond region between the anode lead and the active material layer.

According to an embodiment of the invention, there is provided a second battery including a cathode, an anode, and an electrolyte, wherein the anode is provided with an active material layer containing silicon as an element on a current collector, and an anode lead is bonded to the active material layer with a bond made of copper or an alloy containing copper in between.

According to the first anode of the embodiment of the invention, at least part of the bond region between the anode lead and the active material is made of copper or an alloy containing copper. According to the second anode of the embodiment of the invention, the anode lead is bonded to the active material layer with the bond made of copper or an alloy containing copper in between. Therefore, contact characteristics between the anode lead and the active material layer can be improved, and the electrical resistance can be prevented from increasing even though the anode lead is bonded to the active material layer. In the result, by structuring the first battery of the embodiment of the invention or the second battery of the embodiment of the invention by using the anode, lowering or fluctuation of the battery voltage, or lowering or fluctuation of the battery capacity can be reduced, and deterioration of the cycle characteristics can be prevented.

According to the first method of manufacturing an anode of the embodiment of the invention, the anode lead made of copper or an alloy containing copper in at least part of the bond region between the anode lead and the active material layer is bonded to the active material layer. According to the second method of manufacturing an anode of the embodiment of the invention, the anode lead is bonded to the active material layer with the bond made of copper or an alloy containing copper in between. Therefore, the first anode of the embodiment of the invention or the second anode of the embodiment of the invention can be easily manufactured.

Other and further objects, features and advantages of the invention will appear more fully from the following description.

DETAILED DESCRIPTION OF THE PREFERRED EMBODIMENTS

Figure 1:
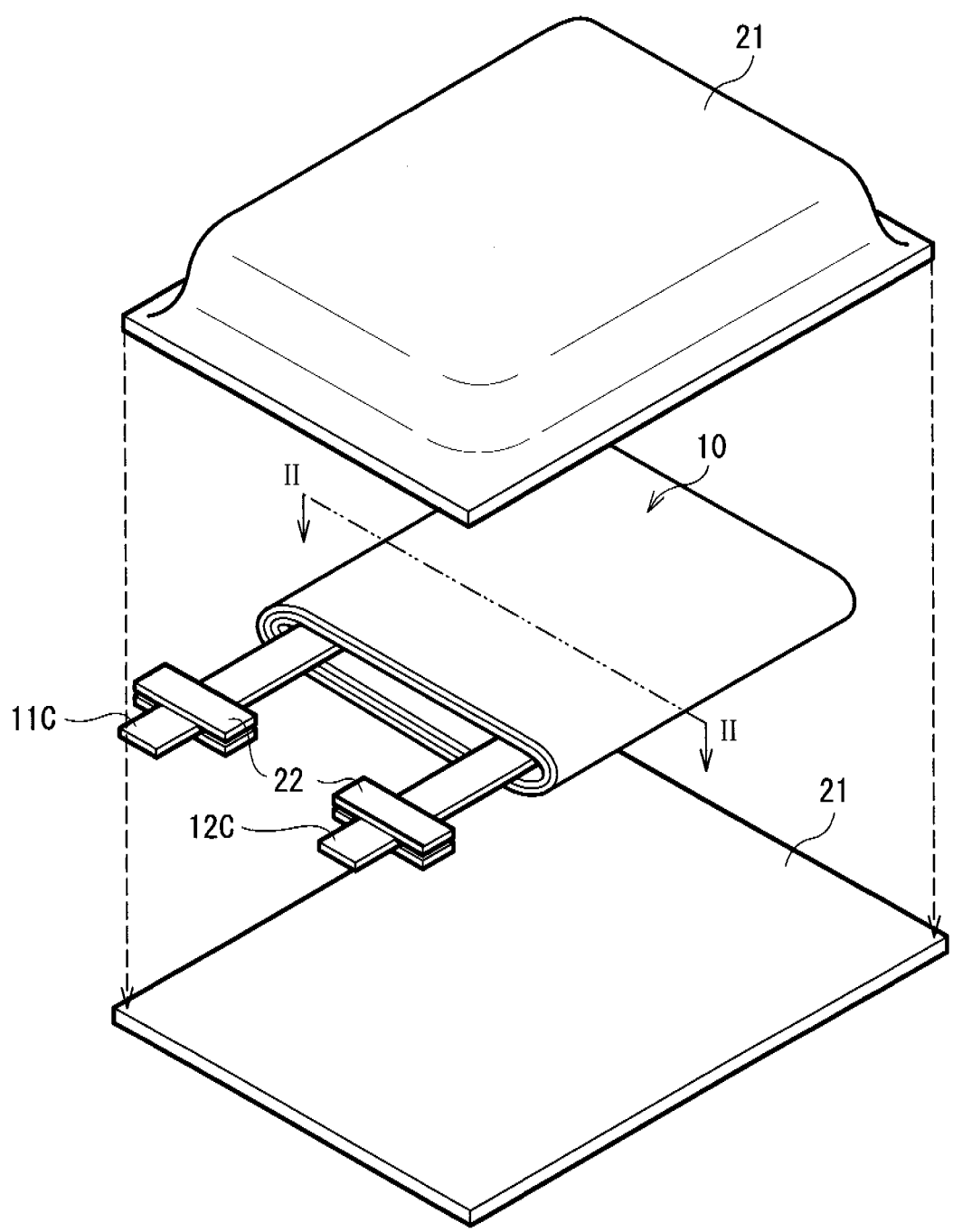
FIG. 1 is a cross section showing a structure of a secondary battery according to a first embodiment of the invention.
Figure 2:
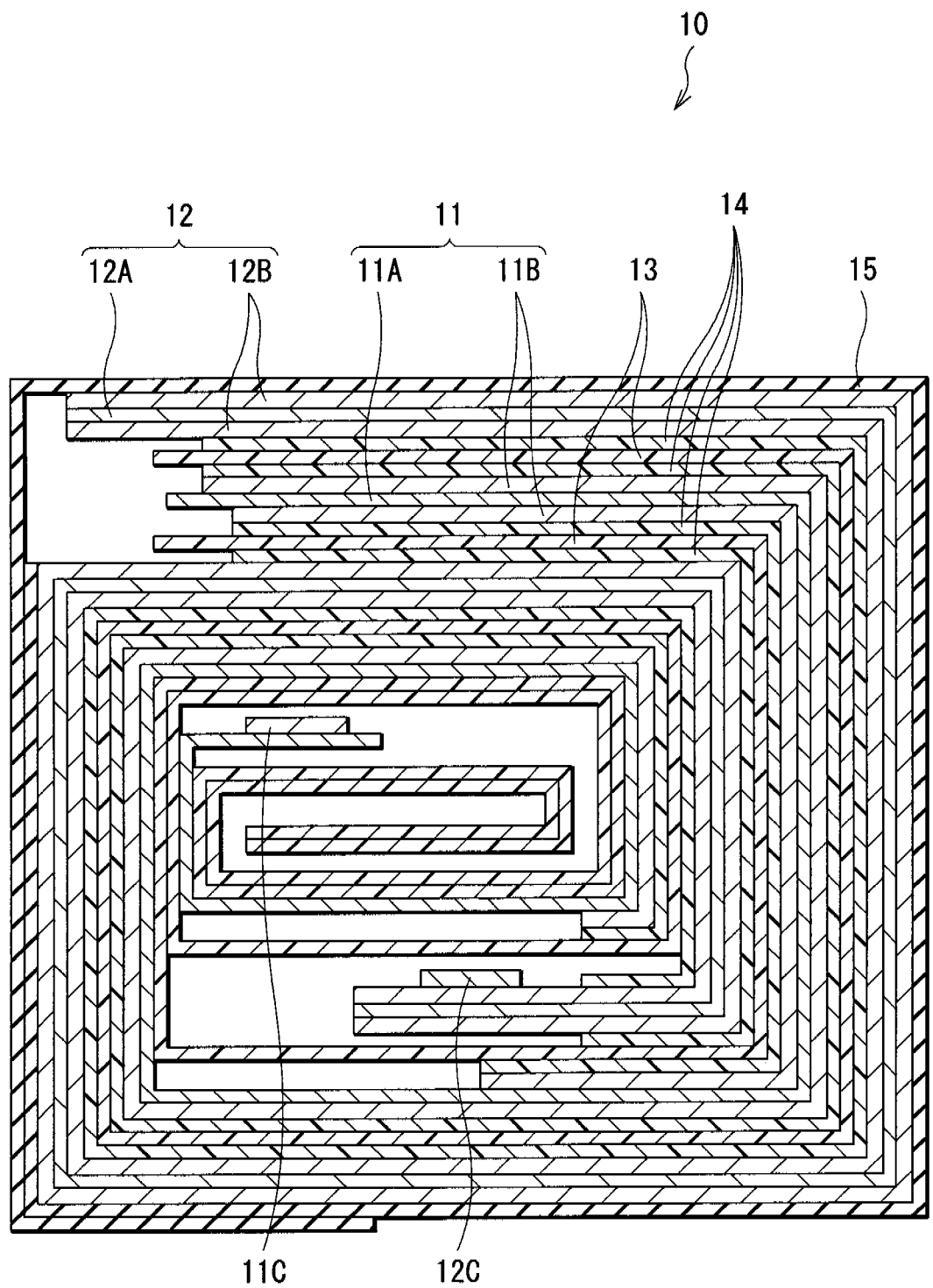
FIG. 2 is a cross section showing a structure taken along line II-II of the secondary battery shown in FIG. 1.

A description will be given of embodiments of the invention in detail with reference to the drawings.
First Embodiment
FIG. 1 shows a structure of a secondary battery according to a first embodiment of the invention. FIG. 2 shows a cross sectional structure taken along line II-II of a spirally wound electrode body shown in FIG. 1. The secondary battery is, for example, a lithium ion secondary battery, and has a structure that a flat spirally wound electrode body 10 is contained in a film package member 21.

The spirally wound electrode body 10 is obtained by layering and spirally winding a cathode 11 and an anode 12 with a separator 13 and an electrolyte layer 14 in between. The outermost periphery is protected by a protective tape 15.

The cathode 11 has a structure that an active material layer 11B is provided on a current collector 11A. The current collector 11A is made of, for example, aluminum, nickel, or stainless.

The active material layer 11B contains, for example, as a cathode active material, one or more cathode materials capable of inserting and extracting lithium (Li). The active material layer 11B may contain an electrical conductor such as a carbon material and a binder such as polyvinylidene fluoride according to needs. As a cathode material capable of inserting and extracting lithium, for example, a lithium-containing metal complex oxide expressed by a general formula, $Li_xMIO_2$ is preferable, since the lithium-containing metal complex oxide can generate a high voltage and has a high density, leading to a higher capacity of the secondary battery. MI represents one or more transition metals, and is preferably, for example, at least one of cobalt and nickel. x varies according to charge and discharge states of the battery, and is generally a value in the range of $0.05 \leq x \leq 1.10$. As a specific example of such a lithium-containing metal complex oxide, $LiCoO_2$, $LiNiO_2$ or the like can be cited.

The cathode 11 is provided with a cathode lead 11C at the end of the central side of the spirally wound body. The cathode lead 11C is made of, for example, aluminum (Al), and is directed from inside to outside of the package member 21.

The anode 12 has a structure that an active material layer 12B containing silicon as an element is provided on a current collector 12A. Silicon has a high ability to insert and extract lithium, and provides a high energy density. The active material layer 12B may contain silicon in the form of a simple substance, an alloy, or a compound. The anode 12 is arranged so that the active material layer 12B side is opposed to the active material layer 11B of the cathode 11.

The current collector 12A is preferably made of a metal material containing a metal element not forming an intermetallic compound with lithium. When the intermetallic compound is formed with lithium, the anode is expanded and shrunk due to charge and discharge, structural destruction occurs, and current collectivity is lowered. In addition, ability to support the active material layer 12B is lowered. In this specification, the metal materials include an alloy including two or more metal elements or an alloy including one or more metal elements and one or more metalloid elements, in addition to simple substances of metal elements. As a metal element not forming an intermetallic compound with lithium, for example, copper, nickel (Ni), titanium (Ti), iron (Fe), or chromium (Cr) can be cited.

In some cases, the current collector 12A more preferably contains a metal element capable of being alloyed with the active material layer 12B. Thereby, contact characteristics between the current collector 12A and the active material layer 12B can be improved by alloying. As a metal element not forming an intermetallic compound with lithium and being alloyed with the active material layer 12B, that is, as a metal element not forming an intermetallic compound with lithium and being alloyed with silicon, copper, nickel, and iron can be cited.

The current collector 12A may be formed of a single layer or a plurality of layers. In the latter case, the layer contacting with the active material layer 12B may be made of a metal material being easily alloyed with the active material layer 12B, and the rest of the layers may be made of other metal materials.

The surface of the current collector 12A is preferably roughened.

The active material layer 12B is preferably formed by vapor-phase deposition method. Thereby, destruction due to expansion and shrinkage of the active material layer 12B associated with charge and discharge can be prevented. Further, the current collector 12A and the active material layer 12B can be integrated, and electron conductivity in the active material layer 12B can be improved.

The active material layer 12B is preferably alloyed with the current collector 12A in at least part of the interface with the current collector 12A. Specifically, on the interface, the element of the current collector 12A is preferably diffused in the active material layer 12B, or the element of the active material layer 12B is preferably diffused in the current collector 12A, or the both thereof are preferably diffused in each other. Thereby, contact characteristics can be improved, and the active material layer 12B is prevented from being dropped from the current collector 12A due to expansion and shrinkage of the active material layer 12B. In this application, the foregoing diffusion of elements is regarded as one form of alloying.

The anode 12 is provided with an anode lead 12C, for example, at the end of the central side of the spirally wound body. The anode lead 12C is directed from inside to outside of the package member 21, and is derived, for example, in the same direction as that of the cathode lead 11C.

The anode lead 12C is bonded to the active material layer 12B. At least part of a bond region 12D between the anode lead 12C and the active material layer 12B is made of copper or an alloy containing copper. Thereby, in the anode 12, contact characteristics between the anode lead 12C and the active material layer 12B can be improved, and an increase in electrical resistance can be prevented. The anode lead 12C is preferably alloyed at part of the interface with the active material layer 12B. Thereby, contact characteristics can be more improved.

Figure 3:
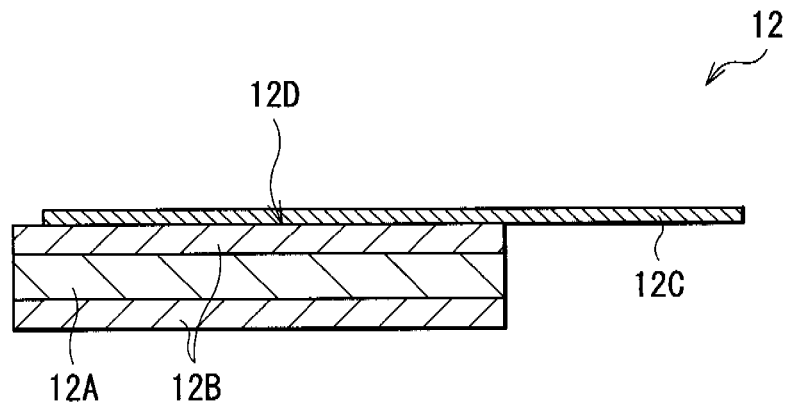
FIG. 3 is a cross section showing a structure of an anode lead shown in FIG. 1 taken along the longitudinal direction of the anode lead.
Figure 4:
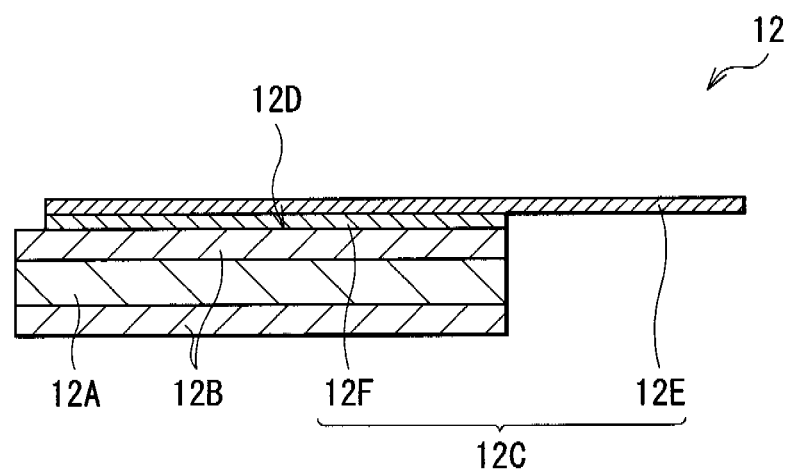
FIG. 4 is a cross section showing another structure of the anode lead shown in FIG. 1 taken along the longitudinal direction of the anode lead.

The anode lead 12C may be made of copper or an alloy containing copper as shown in FIG. 3, for example. Otherwise, a coating layer 12F made of copper or an alloy containing copper may be provided on a base 12E as shown in FIG. 4, for example. As a material of the base 12E, nickel, an alloy containing nickel, iron, and an alloy containing iron can be cited. The coating layer 12F is not necessarily provided on the whole surface of the base 12E. It is enough that the coating layer 12F is provided on at least part of the bond region 12D.

A separator 13 shown in FIG. 2 separates the anode 12 from the cathode 11, prevents current short circuit due to contact of the both electrodes, and lets through lithium ions. The separator 13 is made of, for example, polyethylene or polypropylene.

An electrolyte layer 14 shown in FIG. 2 is made of a so-called gelatinous electrolyte in which an electrolytic solution is held in a holding body made of a polymer. The gelatinous electrolyte is preferable, since a high ion conductivity can be thereby obtained, and liquid leakage of the battery can be thereby prevented. As a polymer material, for example, polyvinylidene fluoride can be cited.

The electrolytic solution contains, for example, a solvent and an electrolyte salt dissolved in the solvent. The electrolytic solution may contain an additive according to needs. As a solvent, for example, a nonaqueous solvent such as ethylene carbonate, propylene carbonate, dimethyl carbonate, diethyl carbonate, and ethyl methyl carbonate can be cited. One of the solvents may be used singly, or two or more thereof may be used by mixing.

As an electrolyte salt, for example, a lithium salt such as $LiPF_6$, $LiCF_3SO_3$, and $LiClO_4$ can be cited. One of the electrolyte salts may be used singly, or two or more thereof may be used by mixing.

The package member 21 shown in FIG. 1 is formed of a rectangular aluminum laminated film in which, for example, a nylon film, an aluminum foil, and a polyethylene film are bonded together in this order. The package member 21 is, for example, arranged so that the polyethylene film side and the spirally wound electrode body 10 are opposed to each other, and the respective outer edges thereof are contacted to each other by fusion bonding or an adhesive.

To improve contact characteristics between the cathode lead 11C/the anode lead 12C and the internal side of the package member 21 and to protect from entering of outside air, adhesive films 22 are inserted between the package member 21 and the cathode lead 11C/the anode lead 12C. The adhesive film 22 is made of a material having contact characteristics to the cathode lead 11C and the anode lead 12C, for example, a polyolefin resin such as polyethylene, polypropylene, modified polyethylene, and modified polypropylene.

The package member 21 may be made of a laminated film having other structure, a polymer film such as polypropylene, or a metal film, instead of the foregoing aluminum laminated film.

The secondary battery can be manufactured as follows, for example.

First, for example, a cathode active material, an electrical conductor, and a binder are mixed to prepare a cathode mixture. The cathode mixture is dispersed in a disperse medium such as N-methyl-2-pyrrolidone to obtain cathode mixture slurry. Next, the current collector 11A is coated with the cathode mixture slurry, which is dried and compression-molded to form the active material layer 11B. Subsequently, the cathode lead 11C is bonded to the current collector 11A by, for example, ultrasonic welding to form the cathode 11.

The active material layer 12B is formed on the current collector 12A by vapor-phase deposition method. As vapor-phase deposition method, for example, physical deposition method or chemical deposition method can be cited. Specifically, vacuum vapor deposition method, sputtering method, ion plating method, laser ablation method, CVD (Chemical Vapor Deposition) method, thermal spraying method or the like can be cited.

In some cases, the active material layer 12B and the current collector 12A are alloyed concurrently when the active material layer 12B is deposited. It is possible that after the active material layer 12B is formed, heat treatment is performed under the vacuum atmosphere or under the non-oxidizing atmosphere to alloy the active material layer 12B and the current collector 12A.

Subsequently, the anode lead 12C is bonded to the active material layer 12B to form the anode 12. The anode lead 12C is preferably bonded to the active material layer 12B by, for example, resistance welding. Thereby, the contact characteristics can be more improved.

After that, the electrolyte layer 14 in which an electrolytic solution is held in a holding body is formed on the surface of the active material layers 11B and 12B on the current collectors 11A and 12A, respectively.

After the electrolyte layer 14 is formed, the cathode 11 and the anode 12 are layered and spirally wound with the separator 13 in between. The protective tape 15 is adhered to the outermost periphery of the resultant to form the spirally wound electrode body 10. Subsequently, for example, the spirally wound electrode body 10 is sandwiched between the package members 21, and outer edges of the package members 21 are contacted with each other by thermal fusion bonding or the like to enclose the spirally wound electrode body 10. Then, the adhesive films 22 are inserted between the cathode lead 11C/the anode lead 12C and the package member 21. Thereby, the secondary battery shown in FIG. 1 and FIG. 2 is completed.

Otherwise, the secondary battery may be manufactured as follows. First, the active material layers 11B and 12B are respectively formed on the current collectors 11A and 12A. The cathode lead 11C and the anode lead 12C are respectively attached thereto to form the cathode 11 and the anode 12. Next, the cathode 11 and the anode 12 are layered and spirally wound with the separator 13 in between. The protective tape 15 is adhered to the outermost periphery thereof, and a spirally wound body as a precursor of the spirally wound electrode body 10 is formed. Subsequently, the spirally wound body is sandwiched between the package members 21, and the outermost peripheries except for one side are thermally fusion-bonded to obtain a pouched state. After that, an electrolytic composition containing an electrolytic solution, a monomer as a raw material for the polymer, a polymerization initiator, and if necessary other material such as a polymerization inhibitor is injected into the package member 21. Subsequently, the opening of the package member 21 is thermally fusion-bonded and hermetically sealed under the vacuum atmosphere. Then, the resultant is heated to polymerize the monomer to obtain a polymer, and the gelatinous electrolyte layer 14 is formed. Thereby, the secondary battery shown in FIG. 1 and FIG. 2 is completed.

In the secondary battery, when charged, for example, lithium ions are extracted from the cathode 11 and inserted in the anode 12 through the electrolytic solution. When discharged, for example, lithium ions are extracted from the anode 12 and inserted in the cathode 11 through the electrolytic solution. In this embodiment, at least part of the bond region 12D between the anode lead 12C and the active material layer 12B is made of copper or an alloy containing copper. Therefore, contact characteristics between the active material layer 12B and the anode lead 12C is improved. Thus, electrical resistance is prevented from being increased.

As above, in this embodiment, at least part of the bond region 12D between the anode lead 12C and the active material layer 12B is made of copper or an alloy containing copper. Therefore, contact characteristics between the active material layer 12B and the anode lead 12C is improved. Thus, even though the anode lead 12C is bonded to the active material layer 12B, electrical resistance can be prevented from being increased. In the result, lowering or fluctuation of the battery voltage, or lowering or fluctuation of the battery capacity can be reduced, and deterioration of the cycle characteristics can be prevented. Further, bond characteristics of the anode lead 12C are improved, and thus reliability of the battery can be improved.

In this embodiment, further, it is not necessary to pattern-form the active material layer 12B on the current collector 12A. Therefore, it is possible to address batteries with various specifications. In addition, it is possible to avoid a complex device structure, to reduce the manufacturing cost, and to improve productivity.

In particular, when the anode lead 12C is made of copper or an alloy containing copper, the electrical resistance can be more decreased, and higher effect can be obtained.

Second Embodiment

Figure 5:
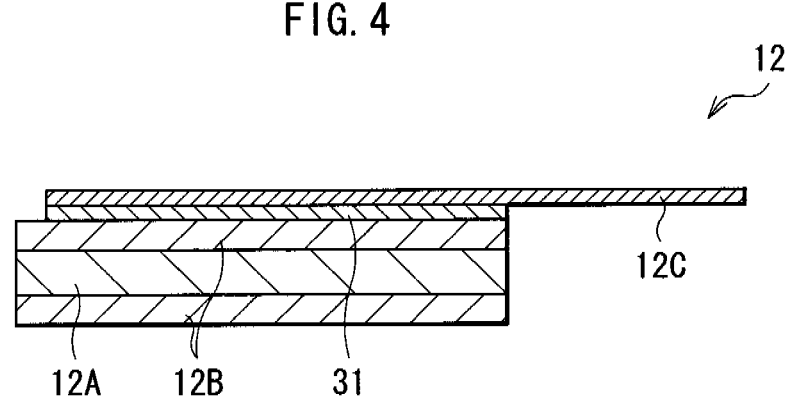
FIG. 5 is a cross section showing a structure of an anode lead of a secondary battery according to a second embodiment of the invention taken along the longitudinal direction of the anode lead.

FIG. 5 shows a structure of an anode lead of a secondary battery according to a second embodiment of the invention in the longitudinal direction thereof. The secondary battery has the same structure as that of the secondary battery described in the foregoing first embodiment, except that the anode lead 12C is bonded to the active material layer 12B with a bond 31 made of copper or an alloy containing copper. Therefore, for the corresponding components, descriptions will be given with the identical referential characters affixed thereto.

The bond 31 is preferably alloyed with the active material layer 12B in at least part thereof. Thereby, the contact characteristics can be more improved. Further, the bond 31 may be alloyed with the anode lead 12C in at least part thereof.

The anode lead 12C is made of, for example, nickel, an alloy containing nickel, iron, or an alloy containing iron.

The secondary battery can be manufactured in the same manner as that of the secondary battery of the foregoing first embodiment, except that the anode lead 12C is bonded to the active material layer 12B with the bond 31 made of copper or an alloy containing copper in between. Further, similar operation and similar effect can be thereby obtained.

EXAMPLES

Further, specific examples of the invention will be hereinafter described in detail with reference to the drawings.

Example 1

First, the current collector 12A made of a copper foil with surface roughness of about Rz=2 μm being 18 μm thick was prepared. On the current collector 12A, the active material layer 12B made of silicon being 5 μm to 6 μm thick was formed by vacuum vapor deposition method using electron beam heating method (electron beam vapor deposition method). The electron beam deposition was made on condition that a crystal silicon ingot was used as a raw material, electron beam was used as an evaporation source, and atmosphere of $1 \times 10^{-2}$ Pa or less was used. The deposition rate was 50 nm/sec.

Next, the anode lead 12C made of copper being 75 μm thick as shown in FIG. 3 was prepared. The anode lead 12C was bonded to the active material layer 12B in a manner that 5 points (10 spots) were bonded by two-spot resistance welding.

Further, 92 parts by weight of lithium cobaltate ($LiCoO_2$) powder being 5 μm in an average particle diameter as a cathode active material, 3 parts by weight of carbon black as an electrical conductor, and 5 parts by weight of polyvinylidene fluoride as a binder were mixed. The mixture was put in N-methyl-2-pyrrolidone as a disperse medium to obtain slurry. Next, the current collector 11A made of an aluminum foil being 15 μm thick was coated with the slurry, which was dried and pressed to form the active material layer 11B. Subsequently, the cathode lead 11C was bonded to the current collector 11A to form the cathode 11.

After that, 37.5 wt % of ethylene carbonate, 37.5 wt % of propylene carbonate, 10 wt % of vinylene carbonate, and 15 wt % of $LiPF_6$ were mixed to prepare an electrolytic solution. The active material layers 11B and 12B were respectively coated with a precursor solution obtained by mixing 30 wt % of the electrolytic solution, 10 wt % of polyvinylidene fluoride as a block copolymer with weight average molecular weight of 0.6 million, and 60 wt % of dimethyl carbonate. The resultant was left for 8 hours at ambient temperatures, and dimethyl carbonate was volatilized. Thereby, the electrolyte layer 14 was formed.

After the electrolyte layer 14 was formed, the cathode 11 and the anode 12 were layered and spirally wound with the separator 13 in between. Thereby, the spirally wound electrode body 10 was formed. The battery design capacity was 800 mAh. The spirally wound electrode body 10 was enclosed in the package member 21 made of an aluminum laminated film. Thereby, the secondary battery of Example 1 was obtained.

As Comparative example 1, a secondary battery was fabricated in the same manner as in Example 1, except that an anode lead made of nickel was used.

Example 2

A secondary battery was fabricated in the same manner as in Example 1, except that the anode lead 12C was bonded to the active material layer 12B with the bond 31 in between as shown in FIG. 5. The anode lead 12C made of nickel being 75 μm thick was used. The bond 31 made of a copper foil being 12 μm thick was used.

Example 3

A secondary battery was fabricated in the same manner as in Example 1, except that as the anode lead 12C, the anode lead in which the coating layer 12F made of copper being 20 μm thick was formed on the base 12E made of nickel being 75 μm thick by cladding as shown in FIG. 4 was used.

Example 4

A secondary battery was fabricated in the same manner as in Example 1, except that as the anode lead 12C, an anode lead in which the coating layer 12F made of copper being 15 μm thick was formed on the base 12E made of nickel being 75 μm thick by plating as shown in FIG. 4 was used.

For the obtained secondary batteries of Examples 1 to 4 and Comparative example 1, charge and discharge test was performed at 25 deg C., and the average battery capacity and the battery capacity standard deviation were examined. For Examples 1 to 4 and Comparative example 1, five samples were evaluated, respectively. The average battery capacity was obtained as follows. Charge and discharge were performed two cycles for the respective batteries under the following charge and discharge conditions. An average of the discharge capacities at the second cycle as a battery capacity was calculated. The obtained results are shown in Table 1.

TABLE 1

|  | Material of anode current collector | Presence of bond | Presence of coating layer | Method of forming coating layer | Average battery capacity (mAh) | Battery capacity standard deviation |
| --- | --- | --- | --- | --- | --- | --- |
| Example 1 | Cu | Not present | Not present | — | 806 | 2.39 |
| Example 2 | Ni | Present | Not present | — | 802 | 3.90 |
| Example 3 | Ni | Not present | Present | Cladding | 805 | 4.83 |
| Example 4 | Ni | Not present | Present | Plating | 801 | 4.77 |
| Comparative example 1 | Ni | Not present | Not present | — | 788 | 13.74 |

The charge and discharge conditions are as follows. In the first cycle, charge was performed until the battery voltage reached 4.2 V at a constant current rate of 0.1 C and then performed until the current rate reached 0.05 C at a constant voltage of 4.2 V, and discharge was performed until the battery voltage reached 2.5 V at a constant current rate of 0.1 C. In the second cycle, charge was performed until the battery voltage reached 4.2 V at a constant current rate of 0.2 C and then performed until the current rate reached 0.05 C at a constant voltage of 4.2 V, and discharge was performed until the battery voltage reached 2.5 V at a constant current rate of 0.2 C. Charge was performed so that the utilization ratio of the capacity of the anode 12 was 90%, and metal lithium was not precipitated on the anode 12. 1C represents a current value at which a battery capacity can be discharged in 1 hour.

As shown in Table 1, in Examples 1 to 4, favorable results were obtained both in the average battery capacity and the battery capacity standard deviation compared to those in Comparative example 1. Further, in Comparative example 1, physical bond characteristics between the anode lead and the active material layer/the current collector were not favorable, and the anode leads of some samples thereof were easily peeled. The reasons of the foregoing results may be as follows. That is, in Examples 1 to 4, bond characteristics of the anode lead 12C were favorable, resistance at the welding region became small, and the resistance fluctuation was reduced. Meanwhile, in Comparative example 1, the resistance at the welding region was increased, and the resistance fluctuation was increased.

That is, from the foregoing results, it was found as follows. When the bond region 12D between the anode lead 12C and the active material layer 12B was made of copper or an alloy containing copper as in Examples 1, 3, and 4, or when the anode lead 12C was bonded to the anode active material layer 12B with the bond 31 made of copper or an alloy containing copper in between as in Example 2, contact characteristics between the active material layer 12B and the anode lead 12C were improved, the electrical resistance could be prevented from increasing, and lowering or fluctuation of the battery voltage could be decreased.

While the invention has been described with reference to the embodiments and the examples, the invention is not limited to the foregoing embodiments and the foregoing examples, and various modifications may be made. For example, in the foregoing embodiments and the foregoing examples, descriptions have been given of the case that the coating layer 12F made of copper or an alloy containing copper is formed on the whole area of the bond region 12D. However, the coating layer 12F may be formed on at least part of the bond region 12D, for example, on only the welding points. The same may be applied to the bond 31.

Further, in the foregoing embodiments and the foregoing examples, descriptions have been given of the case using the so-called gelatinous electrolyte. However, other electrolyte may be used. As other electrolyte, an electrolytic solution as a liquid electrolyte, a solid electrolyte having ion conductivity, a mixture of a solid electrolyte and an electrolytic solution, or a mixture of a solid electrolyte and a gelatinous electrolyte can be cited.

For the solid electrolyte, for example, a polymer solid electrolyte in which an electrolyte salt is dispersed in a polymer having ion conductivity, or an inorganic solid electrolyte composed of ion conductive glass, ionic crystal or the like can be used. As a polymer of the polymer solid electrolyte, for example, an ether polymer such as polyethylene oxide and a cross-linked body containing polyethylene oxide, an ester polymer such as poly methacrylate, or an acrylate polymer can be used singly, by mixing, or by copolymerization. As an inorganic solid electrolyte, a substance containing lithium nitride, lithium phosphate or the like can be used.

Further, in the foregoing embodiments and the foregoing examples, descriptions have been given of the spirally wound laminated type secondary battery. However, the invention can be similarly applied to a secondary battery having other shape such as a coin type secondary battery, a cylinder type secondary battery, a square type secondary battery, a button type secondary battery, a thin secondary battery, a large secondary battery, and a laminated type secondary battery. Further, the invention can be applied to primary batteries in addition to the secondary batteries.

It should be understood by those skilled in the art that various modifications, combinations, sub-combinations and alternations may occur depending on design requirements and other factors insofar as they are within the scope of the appended claims or the equivalents thereof.

What is claimed is:

1. An anode comprising:
   a current collector;
   an active material layer containing silicon on the current collector; and
   an anode lead,
   wherein,
   a bond material made of copper or an alloy containing copper bonds the anode lead to at least a portion of the active material layer, and
   the anode lead has an adhesive film thereon.

2. The anode according to claim 1, wherein the anode lead includes the bond material in at least a portion of the anode lead.

3. The anode according to claim 1, wherein the anode lead has a base and a coating layer that is provided on at least a part of the base, the coating layer being made of the bond material.

4. The anode according to claim 3, wherein the base is made of nickel, an alloy containing nickel, iron, or an alloy containing iron.

5. The anode according to claim 1, wherein the anode lead is alloyed with the active material layer in at least a part of an interface between the anode lead and the active material layer.

6. The anode according to claim 1, wherein the active material layer is formed by vapor-phase deposition method.

7. The anode according to claim 1, wherein the active material layer is alloyed with the current collector in at least a part of an interface between the active material layer and the current collector.

8. An anode comprising:
   a current collector;
   an active material layer containing silicon on the current collector;
   an anode lead; and
   a bond made of copper or an alloy containing copper that bonds the anode lead to at least a portion of the active material layer,
   wherein,
   the bond and the active material layer are alloyed together, and
   the anode lead has an adhesive film thereon.

9. The anode according to claim 8, wherein the active material layer is formed by vapor-phase deposition method.

10. The anode according to claim 8, wherein the active material layer is alloyed with the current collector in at least a part of an interface between the active material layer and the current collector.

11. The anode according to claim 8, wherein the anode lead is made of nickel, an alloy containing nickel, iron, or an alloy containing iron.

12. A method of manufacturing an anode, comprising the steps of:
    providing an active material layer containing silicon on a current collector; and
    bonding an anode lead to at least a portion of the active material layer by means of a bond material made of copper or an alloy containing copper,
    wherein,
    the anode lead has an adhesive film thereon.

13. The method of manufacturing an anode according to claim 12, wherein the anode lead is bonded to the active material layer by resistance welding.

14. A method of manufacturing an anode, comprising the steps of:
    providing an active material layer containing silicon on a current collector;
    bonding an anode lead to at least a portion of the active material layer with a bond made of copper or an alloy containing copper,
    wherein,
    the bond and the active material layer are alloyed together, and
    the anode lead has an adhesive film thereon.

15. A battery comprising:
    a cathode;
    an anode including (i) an active material layer containing silicon on a current collector and (ii) an anode lead; and
    an electrolyte,
    wherein,
    a bond material made of copper or an alloy containing copper bonds the anode lead to at least a portion of the active material layer, and
    an adhesive film is on the anode lead.

16. The battery according to claim 15, wherein the anode lead includes the bond material in at least a portion of the anode lead.

17. The battery according to claim 15, wherein the anode lead has a base and a coating layer that is provided on at least a part of the base, the coating layer being made of the bond material.

18. A battery comprising:
    a cathode;
    an anode including (i) an active material layer containing silicon on a current collector, (ii) an anode lead, and (iii) a bond made of copper or an alloy containing copper that bonds the anode lead to at least a portion of the active material layer; and
    an electrolyte,
    wherein,
    the bond and the active material layer are alloyed together, and
    an adhesive film is on the anode lead.

* * * * *